B. F. GOWDEY.
DEMOUNTABLE RIM.
APPLICATION FILED APR. 13, 1918.
1,318,274.
Patented Oct. 7, 1919.
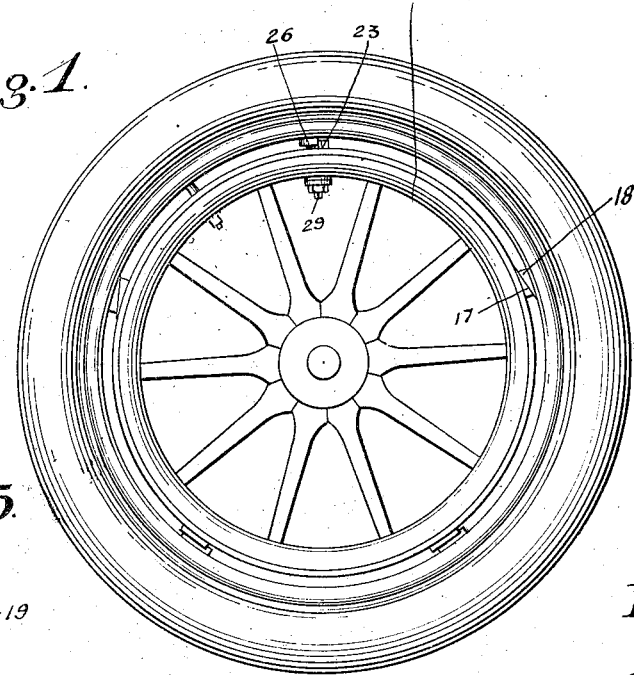
Fig. 1.
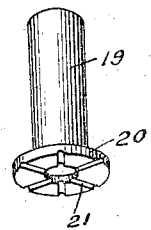
Fig. 5.
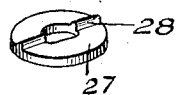
Fig. 6.
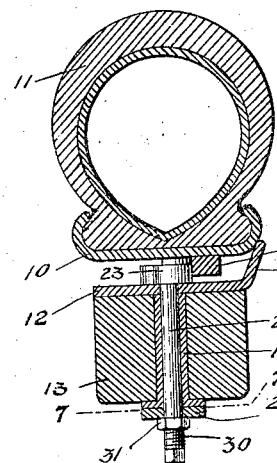
Fig. 2.
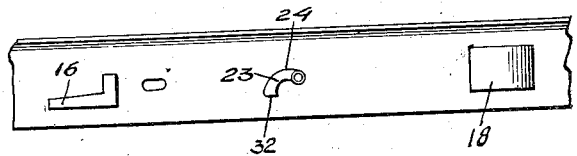
Fig. 3.
Fig. 4.
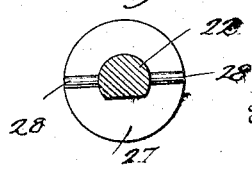
Fig. 7.
Witnesses
Inventor
B. F. Gowdey
By Victor J. Evans
Attorney

UNITED STATES PATENT OFFICE.

BENJAMIN F. GOWDEY, OF ENGLEWOOD, NEW JERSEY.

DEMOUNTABLE RIM.

1,318,274.

Specification of Letters Patent.   Patented Oct. 7, 1919.

Application filed April 13, 1918.   Serial No. 228,431.

*To all whom it may concern:*

Be it known that I, BENJAMIN F. GOWDEY, a citizen of the United States, residing at Englewood, in the county of Bergen and State of New Jersey, have invented new and useful Improvements in Demountable Rims, of which the following is a specification.

This invention relates to demountable rims and has for its principal object the provision of a rim having devices thereon adapted to co-act with similar devices on a fixed rim to effect a clamping action between both of said rims, combining such features with a novel form of locking device which will operate under normal conditions to prevent retrograde movement of the removable rim on the fixed rim, while further serving to permit said demountable rim to be moved circumferentially of said fixed rim and quickly detached therefrom when desired.

With the above and other objects in view which will appear as the nature of the invention is better understood, the same consists in the improved construction and novel arrangements of parts which will hereinafter be fully described and particularly pointed out in the claim.

In the accompanying drawings, has been illustrated, a single and preferred form of the invention, it being, however, understood that no limitations are necessarily made to the precise structural details therein exhibited, but that changes, alterations and modifications within the scope of the claim may be resorted to when desired.

Figure 1 is a side view of a vehicle wheel showing my invention applied thereto.

Fig. 2 is a transverse section through a portion of the wheel and rim.

Fig. 3 is a plan view of a portion of the fixed rim.

Fig. 4 is a plan view of a portion of the demountable rim.

Fig. 5 is a perspective view of the bushing.

Fig. 6 is a perspective view of the coacting washer for said bushing.

Fig. 7 is a view of the locking washer having the stem in section, the said section being approximately on the line 7—7 of Fig. 2.

The demountable rim structure comprises a demountable rim 10 adapted to be connected in a suitable well known manner with the shoe 11 and a fixed rim 12, the latter being connected in any suitable well known manner with the felly 13 of the wheel. The mentioned rim 12 is provided at one side with a flange 14 which is adapted to be projected against one side of the demountable rim when the latter is properly applied as illustrated in Fig. 2.

The demountable rim is provided with wedge-like projections 15 which are adapted to co-act with similar projections 16 on the fixed rim. These projections are adapted to lie one beside the other and when the rim is turned they operate to cause the same to be moved in the direction of the flange 14 of the fixed rim. Other wedges are formed as integral projections of both rims and are respectively illustrated at 17 and 18. They are adapted to lie in superposed relation and are arranged whereby to establish a secure connection between both rims. In this manner, the demountable rim is laterally adjustable and also circumferentially adjustable.

In order to fixedly position and retain the demountable rim on the fixed rim, use is made of a bushing 19 which extends through the felly of the wheel. Against the inner face of the felly and forming a fixed part of the bushing is a locking flange 20 having grooves 21 which radiate from the center of said bushing as illustrated in Fig. 5. Extending through said bushing and adapted to freely rotate therein is a stem 22 which is positioned beyond the rim 12 where it is provided with a crescent shaped head 23 whose convexity 24 is adapted to be projected into a receiving concavity 25 in a fixed crescent shaped projection 26 on the demountable rim 10. When the parts are positioned in this manner, it will be observed that the demountable rim is held against retrograde rotation on the fixed rim.

In order to prevent the stem 22 from casually revolving in its bushing, use is made of the mentioned flange 20 and as shown the stem is provided with a locking washer 27 having radial ribs 28 adapted to fit in a corresponding number of grooves 21 in said flange 20. The free terminal of the stem is provided with angularly disposed surfaces 29, while at a point immediately adjacent said surfaces the stem is threaded as at 30 where it receives an adjusting nut 31. This nut is adapted to come against the washer 27 and advance the same into co-acting engagement with the mentioned flange 20. Through this arrangement of instrumentalities, the stem is positively held in fixed position. The demountable rim is also held fixedly connected against the fixed rim.

Incident to the peculiar formation of the crescent shaped elements 23 and 26, it is seen that the tail or extremity 32 of the element 23 can, when the stem 22 is rotated in one direction, be brought against the tail 33 of the element 26. By placing a tool such as an ordinary wrench onto the surface 29, the stem 22 can be rotated and at such time, pressure of the tail portion of the element 23 will be advanced against the tail portion of the fixed element 26.

The demountable rim is then shifted circumferentially of the fixed rim in order that the former can be quickly separated or detached from the latter.

I desire to place particular emphasis on the design and arrangement of the elements 22 and 26, combining the same with co-acting wedge elements such as those described at 15 and 16 and 17 and 18 and respectively constituting parts of both rims. These features operate to give maximum rigidity between the two rims when connected and it is manifest that the demountable rim can be quickly detached from the fixed rim as the occasion requires.

What is claimed as new is:—

The combination with the vehicle rim, devices thereon, a demountable rim, devices on the demountable rim co-acting with the first-mentioned devices for shifting the rim in a lateral direction, fixed means on the demountable rim, rotatable means on the wheel rim adapted to co-act with said fixed means to hold the demountable rim against retrograde rotation on said wheel rim, means for holding said rotatable means against rotation, both of said fixed and movable means respectively having co-acting portions adapted to be presented against each other to effect rotation of the demountable rim around said wheel rim, said holding means embodying a bushing adapted to be secured to the felly, a grooved flange on the bushing, a stem on the rotatable means passing through the bushing, and provided with a squared end beyond the grooved flange, a washer on the stem adapted to co-act with the grooved flange, and an adjusting nut carried by the stem and arranged at the side of the washer, as and for the purpose specified.

In testimony whereof I affix my signature.

BENJAMIN F. GOWDEY.